United States Patent
Christie et al.

(10) Patent No.: US 6,244,036 B1
(45) Date of Patent: Jun. 12, 2001

(54) CONTROL FOR AUGMENT MODE JP-AIR EMERGENCY POWER UNIT

(75) Inventors: Michael A. Christie, Irvine; Ru-Li Kung, Walnut; Lorenzo Najera, La Mirada, all of CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/260,211

(22) Filed: Mar. 1, 1999

Related U.S. Application Data

(60) Provisional application No. 60/076,559, filed on Mar. 2, 1998, and provisional application No. 60/076,561, filed on Mar. 2, 1998.

(51) Int. Cl.[7] .................................................. F02G 9/00
(52) U.S. Cl. ............................................................ 60/39.03
(58) Field of Search ........................... 60/39.141, 39.142, 60/39.27

(56) References Cited

U.S. PATENT DOCUMENTS

| | | |
|---|---|---|
| 4,554,784 | 11/1985 | Weigand et al. . |
| 4,819,423 * | 4/1989 | Vershure et al. ................. 60/39.02 |
| 4,898,000 | 2/1990 | Weigand et al. . |
| 4,934,136 * | 6/1990 | Weigand et al. ................. 60/39.03 |
| 5,020,317 | 6/1991 | McArthur . |
| 5,184,458 * | 2/1993 | Lampe et al. ..................... 60/39.142 |
| 5,385,011 * | 1/1995 | Steward, Jr. ........................ 60/39.02 |
| 5,388,396 * | 2/1995 | Koerner et al. ..................... 60/39.02 |

* cited by examiner

Primary Examiner—Timothy S. Thorpe
Assistant Examiner—William H Rodriguez
(74) Attorney, Agent, or Firm—William J. Zak, Jr., Esq.

(57) ABSTRACT

An emergency power unit comprises a turbine; a main combustor subsystem upstream of the turbine, with the main combustor subsystem being capable of operation at an augment power output and a main power output; a bleed air subsystem upstream of the turbine, with the bleed air subsystem capable of alternating operation with the main combustor subsystem; and a controller for controlling the operation of the said main combustor subsystem and the bleed air subsystem. In another embodiment, the emergency power unit comprises a turbine; a main combustor subsystem upstream of the turbine; a bleed air subsystem upstream of the turbine, with the bleed air subsystem capable of alternating operation with the main combustor subsystem; a secondary combustor subsystem in communication with the main combustor subsystem, while the secondary combustor subsystem is capable of simultaneous operation with either the bleed air subsystem or the main combustor subsystem; and a controller for controlling the operation of the the main combustor subsystem, bleed air subsystem, and secondary combustor subsystem.

18 Claims, 2 Drawing Sheets

CONTROL FOR AUGMENT MODE JP-AIR EMERGENCY POWER UNIT

CROSS-REFERENCE TO RELATED APPLICATIONS

The present application claims the benefit of U.S. Provisional Application Nos. 60/076,559 and 60/076,561, both of which were filed Mar. 2, 1998.

BACKGROUND OF THE INVENTION

The present invention generally relates to emergency power units on aircraft. More specifically, the present invention relates to an improved emergency power unit having a JP-air subsystem which can operate with a bleed air subsystem for the purpose of minimizing turbine underspeed operation during transition from bleed air mode to JP-air mode. This is accomplished by reducing the time required to ignite the mixture in a main combustor of the JP-air subsystem and then increasing combustor output to the level required to develop the original speed.

An aircraft generally has one or more primary engines that provide thrust for the aircraft, as well as pressurized bleed air for the environmental control system. The primary engine also provides power to drive electric generators and hydraulic pumps, both of which are necessary for powering instruments and flight control systems. In addition, many aircraft also have an auxiliary power unit (APU) to provide power to the aircraft either on the ground or in flight, or both. This power may be provided in the form of one or more of electrical power, hydraulic power, and pressurized air according to the requirements of the aircraft. Unfortunately, starting of an APU may require from many seconds to as much as a few minutes. During this starting time, power from the APU is, of course, not available to the aircraft. As a result, some essential aircraft systems may not be operated during starting of the APU. Also, if the aircraft is above a determined altitude, it may not be possible to start the APU because of low ambient pressure. An aircraft with only an APU may require some other system, such as an emergency power unit (EPU), to provide power to the aircraft until the APU can be started.

The EPU is employed to provide hydraulic or electric power (or both) on a relatively short term basis after a failure of an essential system associated with the aircraft main engines. This emergency power supply allows continuation of controlled aircraft flight for a limited time while the aircraft is brought to a landing or to an altitude low enough to allow starting of the aircraft APU or restarting the main propulsion engine. The development of unstable aircraft has increased the need for providing a rapidly available source of emergency power. Upon a failure of the main hydraulic pump, or main generator, or of the aircraft propulsion engine driving these devices, the aircraft cannot be maintained in controlled flight. Without hydraulic power to move the aircraft control surfaces, or electrical power for flight control computers, the unstable aircraft is uncontrollable. Thus, these aircraft must have a source of emergency power which is available almost immediately after the failure of a flight control related power system.

In the past, EPUs have employed a hydrazine decomposition chamber or a jet fuel (e.g., JP fuel) combustor to provide a flow of high temperature pressurized motive gas to a turbine. In turn, the turbine drives a hydraulic pump or electric generator, for example. One example of a hydrazine chamber is shown in U.S. Pat. No. 4,554,784. Typically, liquid hydrazine has been sprayed onto a catalyst bed. The amount sprayed is metered to control the volume of gas produced by the chamber which then controls the speed of the turbine. However, this system has disadvantages, including the fact that hydrazine is corrosive and toxic. In order to undergo decomposition, the hydrazine must be sufficiently unstable, which presents a safety hazard. When the catalyst is depleted, the catalyst must be replaced and is oftentimes expensive. Further, hydrazine and appropriate storage facilities for it may not be readily available at different locations.

A jet fuel combustor is shown, for example, in U.S. Pat. No. 4,898,000. Within a combustion chamber, air from a tank is mixed from a separate tank. The fuel rich mixture is then ignited to drive a turbine. An advantage of the jet fuel combustor over the hydrazine chamber is that jet fuel, such as JP fuel, is more readily available and non-toxic. However, a limitation is that it can often take up to about 5 seconds to ignite the system. This length of delay could likely be enough time for a pilot to lose control of the aircraft. Further, a jet fuel combustor (as well as the hydrazine chamber) has a limited run time.

In an effort to overcome at least some of the above design limitations, a jet fuel combustor subsystem has been combined with a bleed air subsystem. This is shown, for example, in U.S. Pat. No. 4,898,000. In general, the combination of a jet fuel combustor subsystem and bleed air subsystem enables the subsystems to be alternately operated, thereby increasing the total run time of the EPU. Unfortunately, as the subsystems are alternately started and stopped, there is a turbine underspeed for a period of time during which the turbine speed drops due to a lack of power input. The drop time can vary, for example, from 1 to 5 seconds. While seemingly of short duration, the effects can be significant. The time during which the turbine speed drops below a required speed means that hydraulic and/or electrical power is likewise reduced during such time. But the reduction of hydraulic and/or electrical power may be of sufficient duration to cause a loss of control of the aircraft.

As can be seen, there is a need for an improved EPU, including one that can be used on aircraft. Another need is for an improved EPU that incorporates both a jet fuel combustor subsystem and bleed air subsystem. Also needed is an EPU that has, in effect, a decreased starting time. Similarly, an EPU is needed that reduces the turbine speed drop time that can occur when alternating operation from a bleed air subsystem and to a jet fuel combustor subsystem.

SUMMARY OF THE INVENTION

An emergency power unit according to the present invention comprises a turbine; a main combustor subsystem upstream of the turbine, with the main combustor subsystem being capable of operation at an augment power output and a main power output; a bleed air subsystem upstream of the turbine, with the bleed air subsystem capable of alternating operation with the main combustor subsystem and being able to operate simultaneously with the augment mode of the main combustor subsystem; and a controller for controlling the operation of the main combustor subsystem and the bleed air subsystem.

In another embodiment of the present invention, an emergency power unit comprises a turbine; a main combustor subsystem upstream of the turbine; a bleed air subsystem upstream of the turbine, with the bleed air subsystem capable of alternating operation with the main combustor subsystem; a secondary combustor subsystem in communication with the main combustor subsystem, while the secondary combustor subsystem is capable of simultaneous operation with either the bleed air subsystem or the main combustor subsytem; and a controller for controlling the operation of the main combustor subsystem, bleed air subsystem, and secondary combustor subsystem.

The present invention also provides a method of providing emergency power, comprising the steps of: driving a turbine by a main combustor subsystem and a bleed air subsystem; providing an augment power output and a main power output from the main combustor subsystem; alternately operating the bleed air subsystem and the main combustor subsystem; and minimizing a turbine speed drop time that can be created during the step of alternately operating.

In an alternative method of providing emergency power, the steps comprise driving a turbine by a main combustor subsystem and a bleed air subsystem; providing a main power output from the main combustor subsystem; alternately operating the bleed air subsystem and the main combustor subsystem; providing an augment power output from a secondary combustor subsystem; concurrently operating the secondary combustor subsystem with either the main combustor subsystem or the bleed air subsystem; and minimizing a turbine speed drop time that can be created during the step of alternately operating.

These and other features, aspects and advantages of the present invention will become better understood with reference to the following drawings, description and claims.

DETAILED DESCRIPTION OF THE INVENTION

Figure 1:
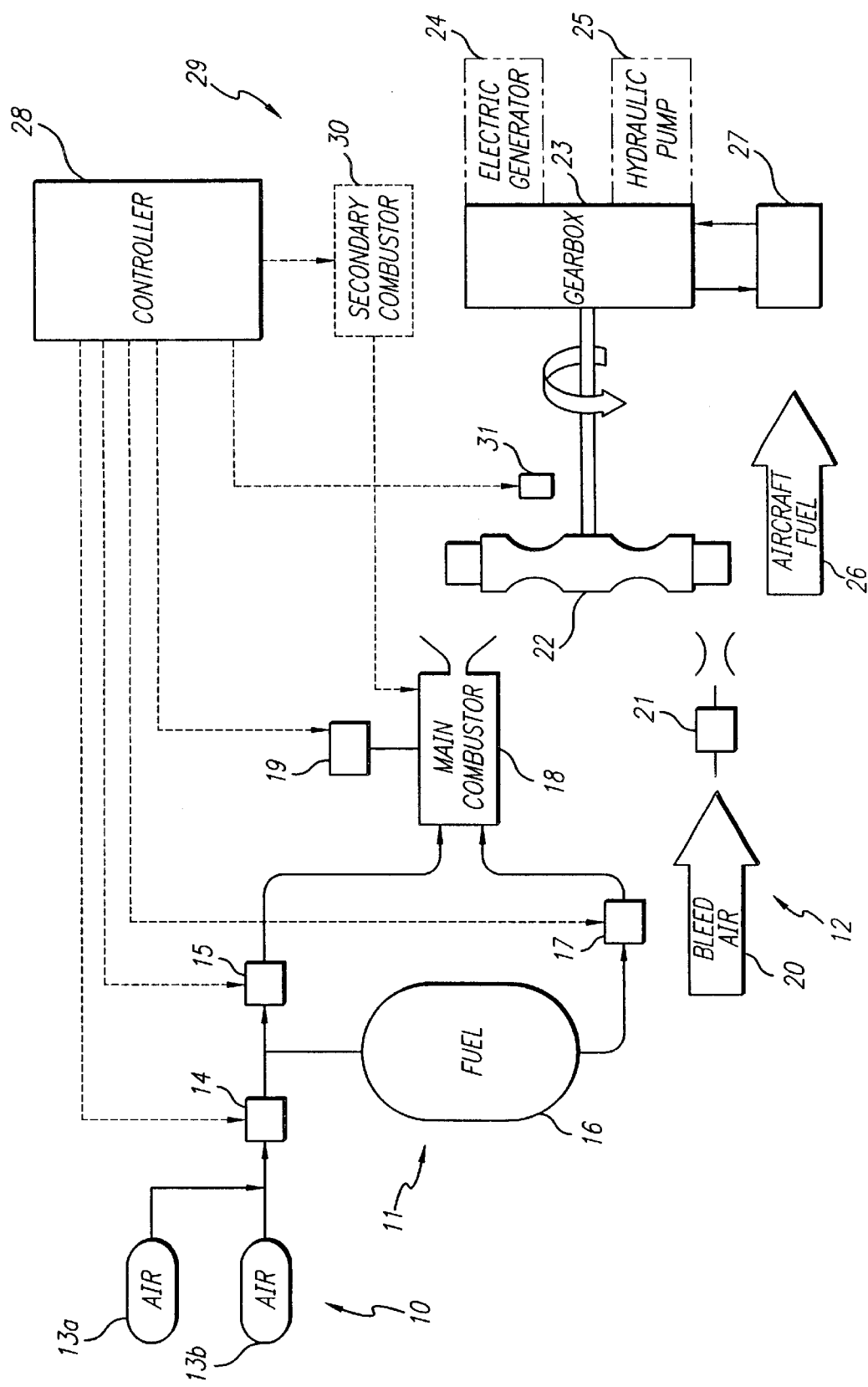
FIG. 1 is a schematic diagram of an emergency power unit according the present invention.

While the preferred embodiments of the present invention are described in the context of aircraft, the invention is not so limited. For example, the present invention can be utilized for land-based or other vehicles.

In general, the emergency power unit (EPU) 10 of the present invention includes a main combustor subsystem 11, a bleed air subsystem 12, and a secondary combustor subsystem 29. The main combustor subsystem 11 alternately operates with the bleed air subsystem 12 to drive a turbine 22. In turn, an electric generator 24 and/or hydraulic pump 25 are powered. The main combustor subsystem 11 can produce an auxiliary power output before producing a main power output. The secondary combustor subsystem 29—located either externally or internally to a main combustor 18 of the subsystem 11—produces the auxiliary power output through the main combustor subsystem 11 and before the main power output is produced. Regardless of where the secondary combustor subsystem 29 is located, the auxiliary power output effectively reduces the start or ignition time for the main power output. The reduction in start time, in turn, reduces a turbine speed drop time that can occur between when bleed air subsystem stops and the main combustor subsystem 11 starts.

Referring to FIG. 1, it can be seen that the main combustor subsystem 11 includes a pair of air sources 13a,b. However, it can be appreciated from the following description that more or less than two air sources can be used. The air sources 13a,b provide air through an air shutoff and regulator valve 14 and then through an air control valve 15. The function of the air shutoff valve 14 is to enable complete shutoff of air from the air sources 13a,b, while the function of the air control valve 15 is to control the amount of air moving into a main combustor 18.

The main combustor 18 of the main combustor subsytem 11 can be constructed according to well know practices in the art. Examples of suitable combustors are shown in U.S. Pat. No. 5,388,396 and 4,898,000. The main combustor subsystem 11 further comprises a fuel source 16 which provides a source of fuel that is preferably separate from a fuel source for the primary engines of an aircraft. Although only one fuel source 16 is shown in FIG. 1, the present invention contemplates that multiple fuel sources 16 can be provided. Irrespective of the number, the fuel source 16 provides fuel, such as JP fuel, through a fuel control valve 17 that controls the amount of fuel that flows into the main combustor 18. Thereby, and upon the start of an ignition unit 19, the jet fuel from the fuel source 16 and the air from the air sources 13a,b can be combusted in a desired ratio and total volume. As an example, the ratio of fuel to air can be fixed to provide a fuel rich exhaust exiting the main combustor 18.

The combustion exhaust from the main combustor 18 can then be used to drive a turbine 22. The output from the turbine 22 can, in turn, drive a gearbox 23 for eventual powering of the electric generator 24 and/or hydraulic pump 25. In that instance, a fuel 26 is supplied to an oil cooler 27 to maintain the temperature of the oil in the gearbox 23 at a safe level. Alternatively, and as mentioned above, the turbine 22 can be driven by the bleed air subsystem 12.

The bleed air subsystem 12 includes a bleed air source 20. The source 20 can be from one or more of various stages in a primary engine of the aircraft. The bleed air flows through a valve 21 to regulate the amount of air that eventually flows to the turbine 22. It can be understood that altering the flow of bleed air to the turbine 22 will alter the speed of the turbine 22. Likewise, altering the exhaust flow from the main combustor 18 will alter the speed of the turbine 22. In either situation, the speed of the turbine 22 will dictate the eventual output of the electric generator 24 and/or hydraulic pump 25.

As shown in FIG. 1, a controller 28 controls, among other things, the functioning of the air shutoff valve 14, the air control valve 15, the fuel control valve 17, and the ignition unit 19. The particular computer hardware and software components that make up the controller 28 can be of well known design that allow, among other things, start/stop commands. For example, the controller 28 may be built in a fashion similar to that shown in U.S. Pat. No. 4,898,000. By the controller 28 controlling the above components, the main combustor 18 can be operated (via the secondary combustor subsystem 29) at an augment power mode and output when the bleed air subsystem 12 is operational. Alternatively, the main combustor 18 can be operated at a main power mode and output when the bleed air subsystem 12 is non-operational. The main power output is generally the amount of power output required to drive the turbine 22 within a desired speed range so that the electric generator 24 and/or hydraulic pump 25 are satisfactorily powered. The augment power output is generally less in quantity than the main power output. The amount by which the augment output is less than the main output can vary depending upon the particular application for the EPU 10.

Thus, in an emergency when the EPU 10 is needed, the controller 28 can rapidly increase the power output from the augment power level to the main power level. The time over which the power increase can occur can be optimized for the given application. This provision of an augment power is in contrast to prior designs wherein the combustor undergoes a "cold start." In other words, the combustor was not operating, an emergency occurred, the combustor was then ignited, and then there was a time lag between ignition and when the needed power level was reached. However, in the present invention, the time and/or power lag (i.e., turbine underspeed) is minimized because the combustor 18 is already ignited and producing a relatively low power output when the emergency arises.

The secondary combustor subsystem 29—either internally or externally located to the main combustor 18—includes a secondary combustor 30 that can be of a design similar to the main combustor 18. Although not shown in FIG. 1, the secondary combustor 30 can be fueled by the air sources 13a,b and fuel source 16 or by other sources. As already mentioned, a function of the secondary combustor 30 is to provide a secondary or augment power output during the time the bleed air subsystem 12 is operational. Another function is to quickly ignite the fuel/air mixture in the main combustor 18 when the bleed air subsystem 12 shuts down and the main combustor subsystem 11 becomes operational.

More specifically, when the bleed air subsytem 12 is operational and the main combustor subsystem is non-operational, the augment power is being provided but not in a manner that significantly assists the bleed air subsystem 12 to rotate the turbine 22. But when there is a need to switch from the bleed air subsystem 12 to the main combustor subsystem 11, the bleed air subsystem 12 can be shut down while the secondary combustor 30 continues to produce the augment power and a continuous, power ignition source for the main combustor subsystem 11. Accordingly, when the bleed air subsystem 12 shuts down, the main combustor 18 is simultaneously ignited to produce the main power output required to satisfactorily power the electric generator 24 and/or the hydraulic pump 25. Thereby, the time/power lag is effectively reduced because the secondary combustor 30 is already providing some power to the turbine 22 which would not otherwise exist in the prior "cold start" design.

Figure 2:
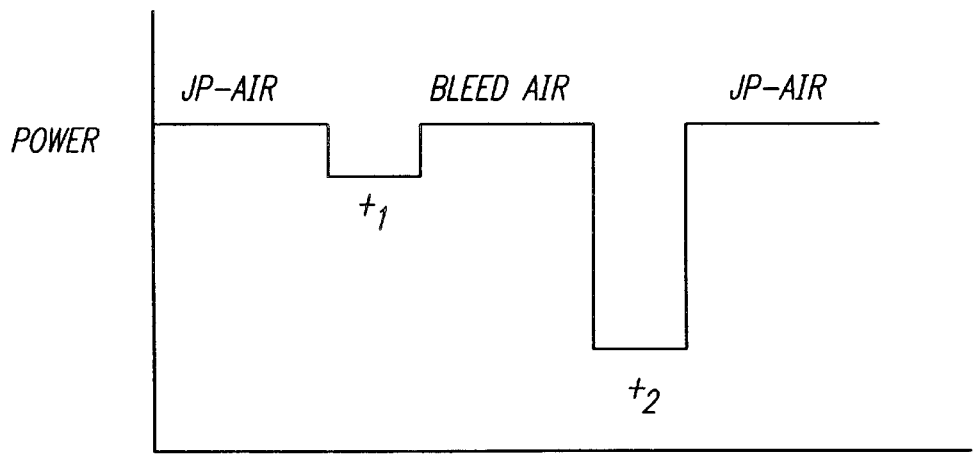
FIG. 2 is a graph depicting output power v. time for an emergency power unit according to the present invention.

Another time/power lag that occurs is when the main combustor subsystem 11 stops and then the bleed air subsystem 12 starts and reaches its required output. This, however, is a condition which does not significantly interfere with power output of the EPU 10. As shown in FIG. 2, when the main combustor subsystem 11 (i.e., JP-Air) alternates with the operation of the bleed air subsystem 12, power generated by the EPU 10 drops for a period of time due to underspeed of the turbine 22. In FIG. 2, the times $t_1$ and $t_2$ are shown for purposes of illustration as the time over which a power drop occurs. For purposes of example, FIG. 2 depicts the JP-Air subsystem 11 stopping, the power dropping slightly for a time $t_1$, the bleed air subsystem 12 becoming operational and then stopping. The power then significantly drops for a time $t_2$ until the JP-Air subsystem 11 reaches its main output level. This turbine underspeed time or turbine speed drop time, however, is minimized by the present invention by the provision of the augment power mode. In other words, the time $t_2$ is minimized. Of course, the particular times and power levels can vary according to the particular application.

The augment power mode provides a low level of turbine 22 speed that is below a desired speed range. The low level of turbine speed and desired speed range can vary for any particular application. In any event, since the turbine 22 has a low level of speed during the augment mode, there is less time required for the turbine 22 to reach the desired speed range when compared to the time required to reach the same desired speed range when a turbine starts from a complete stop. With less time required to reach the desired speed range, there is less time that the turbine 22 is operating at an underspeed, i.e., below the desired speed range.

Figure 3:
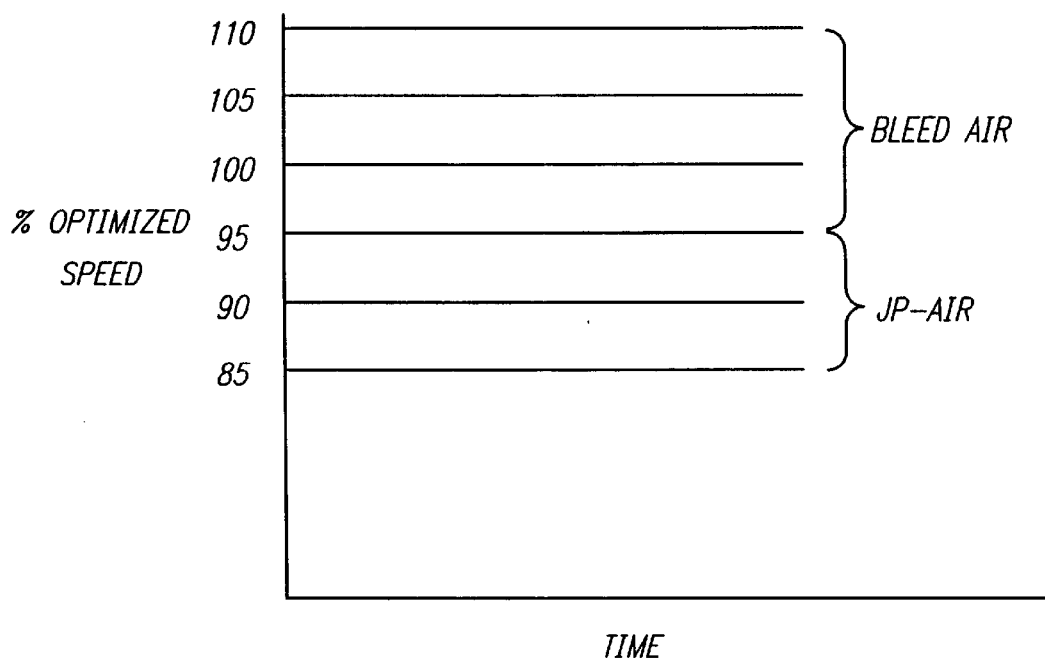
FIG. 3 is a graph of percentage of optimum turbine speed v. time for an emergency power unit according to the present invention.

The operation of the JP-Air subsystem 11 and the bleed air subsystem 12 are graphically depicted in FIG. 3. As an example, the embodiment shown in FIG. 3 indicates that EPU 10 can operate between 85 to 110% of an optimized turbine 22 speed. This is in contrast to past designs that merely incorporated a bleed air and JP-Air subsystems without an augment mode of operation and needed to operate between about 90–110%. The narrower speed range (and particularly the minimum speed) for past designs is due, at least in part, to the turbine speed drop time issue. As a general proposition, the further away the turbine speed dropped from an optimized speed, the more time was necessary for the speed to return to the optimized speed. And as the time needed to return to the optimized speed was increased, so was the turbine speed drop time. Therefore, in past designs, the turbine speed drop time was minimized by narrowing the overall speed range of the turbine—e.g., about 90–110%.

In contrast to the above past design, the present invention expands the operating environment. For the example shown in FIG. 3, the JP-Air subsystem 11 maintains the turbine 22 speed within a speed range that is about 85 to 110% of an optimized turbine 22 speed. Likewise, the bleed air subsystem 12 maintains the turbine 22 speed within a different speed range that is about 95 to 110% of the optimized turbine 22 speed. As such, when a speed sensor 31 senses that the turbine 22 speed exceeds about 95%, for example, the controller 28 switches operation from the JP-Air subsystem 11 to the bleed air subsystem 12. Further, if the turbine 22 speed drops below about 95%, then the controller 28 switches operation from the bleed air subsystem 12 to the JP-Air subsystem 11. Of course, the above ranges and percentages can be varied for a given application.

For those skilled in the art, it can be appreciated that the present invention provides an improved EPU, including one that can be used on aircraft. The present invention also provides an improved EPU that incorporates both a jet fuel combustor subsystem and bleed air subsystem while providing an augment mode of operation. The present invention includes a secondary combustion subsystem that can provide the augment mode of operation. The present invention also provides an EPU that has, in effect, a decreased starting time. In particular, the EPU of the present invention reduces the turbine speed drop time that can occur when alternating operation between a bleed air subsystem and a jet fuel combustor subsystem.

It should be understood, of course, that the foregoing relates to preferred embodiments of the invention and that modifications may be made without departing from the spirit and scope of the invention as set forth in the following claims.

We claim:

1. An emergency power unit, comprising:
   a turbine;
   a main combustor subsystem upstream of and in gas communication with said turbine, said main combustor subsystem being capable of operation at an augment power output and a main power output;

a bleed air subsystem upstream of and in gas communication with said turbine, said bleed air subsystem capable of alternating operation with said main combustor subsystem;

a secondary combustor subsystem in gas communication with said turbine;

a speed sensor in communication with said turbine; and a controller in communication with said speed sensor for controlling the operation of the said main combustor subsystem, said bleed air subsystem and said secondary combustor subsystem.

2. The unit of claim 1, wherein said controller controls said main combustor subsystem, said bleed air subsystem and said secondary combustor subsystem such that said main power output is greater than said augment power output.

3. The unit of claim 1, wherein operation of said main combustor subsystem at said augment power output minimizes a turbine speed drop time that occurs between said bleed air subsystem shutting down and said main combustor subsystem becoming operational.

4. The unit of claim 1, wherein said bleed air subsystem is capable of maintaining a turbine speed in a first range and said main combustor subsystem is capable of maintaining a turbine speed in a second range.

5. The unit of claim 4, wherein said controller controls said first range at about 95 to 110% of an optimized turbine speed and said second range at about 85 to 110% of said optimized turbine speed range.

6. The unit of claim 1, wherein said main combustor subsystem comprises a main combustor, a fuel source in communication with said main combustor, and an air source in communication with said main combustor.

7. The unit of claim 1, wherein said bleed air subsystem comprises a bleed air source.

8. An emergency power unit, comprising:

a turbine;

a main combustor subsystem upstream of and in gas communication with said turbine, said main combustor subsystem comprising a main combustor;

a bleed air subsystem upstream of and in gas communication with said turbine, said bleed air subsystem capable of alternating operation with said main combustor subsystem;

a secondary combustor subsystem being disposed in one of an internal position and external position to said main combustor, said secondary combustor subsystem being in communication with said main combustor subsystem and capable of simultaneous operation with one of said main combustor subsystem and bleed air subsystem;

a speed sensor in communication with said turbine; and a controller in communication with said speed sensor for controlling the operation of the said main combustor subsystem, bleed air subsystem, and secondary combustor subsystem.

9. The unit of claim 8, wherein said main combustor subsystem produces a main power output, and said secondary combustor subsystem produces a secondary power output in conjunction with said main combustor subsystem.

10. The unit of claim 8, wherein said secondary combustor subsystem minimizes a turbine underspeed time that occurs between said bleed air subsystem shutting down and said main combustor subsystem becoming operational, said secondary combustor subsystem being capable of providing a continuous, power ignition source and an augment power to said bleed air subsystem.

11. The unit of claim 8, wherein said bleed air subsystem is capable of maintaining a turbine speed in a first range and said main combustor subsystem is capable of maintaining a turbine speed in a second range.

12. The unit of claim 8, wherein said main combustor subsystem further comprises a fuel source in communication with said main combustor and an air source in communication with said main combustor.

13. The unit of claim 8, wherein said bleed air subsystem comprises a bleed air source.

14. The unit of claim 8, wherein said secondary combustor subsystem comprises a secondary combustor, a fuel source in communication with said secondary combustor, and an air source in communication with said secondary combustor.

15. An emergency power unit for aircraft, comprising:

a turbine;

a main combustor subsystem upstream of and in gas communication with said turbine;

a bleed air subsystem upstream of and in gas communication with said turbine, said bleed air subsystem capable of alternating operation with said main combustor subsystem, said alternating operation being capable of creating a turbine underspeed that occurs during a transition from a bleed air mode to a main combustor mode;

a secondary combustor subsystem in gas communication with said turbine and in communication with said main combustor subsystem, said secondary combustor subsystem capable of simultaneous operation with one of said main combustor subsytem and bleed air subsystem such that a turbine underspeed time is minimized;

a speed sensor in communication with said turbine; and a controller in communication with said speed sensor for controlling the operation of the said main combustor subsystem, bleed air subsystem, and secondary combustor subsystem.

16. The unit of claim 15, wherein said main combustor subsystem produces a main power output, and said secondary combustor subsystem produces an augment power output.

17. The unit of claim 15, wherein said controller controls said bleed air subsystem to maintain a turbine speed in a first range which is about 95 to 110% of an optimized turbine speed.

18. The unit of claim 15, wherein said controller controls said main combustor subsystem to maintain a turbine speed in a second range that is about 85 to 110% of an optimized turbine speed.

* * * * *